United States Patent Office.

ROBERT F. MAIER, OF NEWARK, NEW JERSEY.

CONDIMENT.

SPECIFICATION forming part of Letters Patent No. 316,799, dated April 28, 1885.

Application filed November 19, 1884. (No specimens.)

*To all whom it may concern:*

Be it known that I, ROBERT F. MAIER, a citizen of the United States, residing at Newark, in the State of New Jersey, have invented a certain new and useful Compound Table-Salt; and I do hereby declare the following to be a full, clear, and exact description of the invention.

My invention has for its object the provision of a substitute for table or household salt now generally consisting of chloride of sodium alone or combined with certain flavoring ingredients; and my invention consists in a compound or mixture of chloride of sodium, constituting the principal ingredient of the salt, with certain other ingredients possessing specific medicinal or health and strength nourishing properties.

Heretofore table, domestic, or culinary salt consisting of chloride of sodium has been generally used merely as a condiment or seasoning to render certain kinds of foods palatable, and without special reference to its properties as a medicament or its service in promoting health or in any way nourishing the system. For the proper and adequate nourishment of the body other substances are required to supply the muscles, blood, bones, and brain with their constituents. While these are found to a certain extent in ordinary food substances, their presence is usually in insufficient quantity and proportion to meet the requirements of the system. The purpose of my saline preparation is to supply with the chloride of sodium certain other salts in such proportion as the requirements of health and nourishment indicate, these being to afford necessary aids to digestion, assimilation, and nourishment which cannot be obtained from the chloride of sodium alone.

My invention specifically consists in combining or mixing with the chloride of sodium or common salt the ingredients set forth in the following formula, in or about in the proportions designated, such ingredients being well known as essential constituents of the body in the formation of muscle, bone, blood, and brain substance, and necessary promoters of their nourishment, and their proportion being such as experience has indicated suitable for the adequate supply and compensation for waste in the different parts of the body with which they respectively assimilate: chloride of sodium, two hundred parts; hypophosphite of soda, one part; chloride of potassium, three-fourths of one part; sulphate of soda, two-fifths of one part; hypophosphite of lime, three-fifths of one part. These proportions may be somewhat varied without departing from the essential features of the composition.

I have adopted common salt or chloride of sodium as the principal ingredients in order that the preparation may be used in the same way and for the same purposes as common salt, such use being for many obvious reasons advantageous and agreeable.

The compound salt is taken with the food, and thus undergoes with it the process of digestion, aiding thereby the digestive operations and assisting the distribution and proper assimilation of the different ingredients according to the specific objects which they are adapted, respectively, to serve.

The specific medicinal properties of the ingredients named are well understood and need not be dwelt upon.

The formula I have given may be modified within the spirit of the invention; but I would suggest that the most essential feature is the combination of common salt or chloride of sodium with hypophosphites and sulphates in the proportion generally of a large amount of the former to a very small proportion of the latter, so that the preparation partakes of the nature of a medicated table-salt having all the qualities of a condiment or seasoning, and, in addition thereto, the specific medical properties inherent in the ingredients added thereto.

What I claim is—

1. A compound table, domestic, or culinary salt consisting of chloride of sodium combined or mixed with a small proportion of hypophosphite to impart to the salt medicinal properties, substantially as set forth.

2. The compound table-salt herein described, consisting of chloride of sodium, hypophosphite of soda, chloride of potassium, sulphate of soda, and hypophosphite of lime, in the proportion substantially as set forth.

In testimony that I claim the foregoing I have hereunto set my hand this 17th day of November, 1884.

ROBERT F. MAIER.

Witnesses:
   THOS. A. CONNOLLY,
   C. E. NYLANDER.